United States Patent [19]

Ogino et al.

[11] 3,821,203
[45] June 28, 1974

[54] SEPARATION OF BENZODIAZEPINE COMPOUNDS

[75] Inventors: Shigeo Ogino, Ashiya; Fumitaka Kishimoto, Takarazuka; Hiroo Wada, Takatsuki, all of Japan

[73] Assignee: Sumitomo Chemical Company Limited, Osaka, Japan

[22] Filed: June 16, 1972

[21] Appl. No.: 263,468

[30] Foreign Application Priority Data
June 18, 1971 Japan................................ 46-44059

[52] U.S. Cl. ......................... 260/239.3 D, 260/999
[51] Int. Cl............................................ C07d 53/06
[58] Field of Search........................... 260/239.3 D

[56] References Cited
UNITED STATES PATENTS

| | | | |
|---|---|---|---|
| 3,121,075 | 2/1964 | Keller et al. | 260/239.3 D |
| 3,131,178 | 4/1964 | Archer et al. | 260/239.3 D |
| 3,236,838 | 2/1966 | Archer et al. | 260/239.3 D |
| 3,270,053 | 8/1966 | Reeder et al. | 260/239.3 D |
| 3,299,053 | 1/1967 | Archer et al. | 260/239.3 D |
| 3,391,138 | 7/1968 | Archer et al. | 260/239.3 D |
| 3,422,091 | 1/1969 | Archer et al. | 260/239.3 D |

*Primary Examiner*—Henry R. Jiles
*Assistant Examiner*—Robert T. Bond
*Attorney, Agent, or Firm*—Wenderoth, Lind & Ponack

[57] ABSTRACT

Benzodiazepine compounds are separated from each other by extracting the material containing the mixture of benzodiazepine compunds with an organic solvent and subjecting the extract to chromatography with hydroxypropylated dextran gel.

1 Claim, No Drawings

SEPARATION OF BENZODIAZEPINE COMPOUNDS

This invention relates to an improved method for the isolation and/or purification of benzodiazepine compounds.

Benzodiazepine compounds, for example, those represented by the general formula:

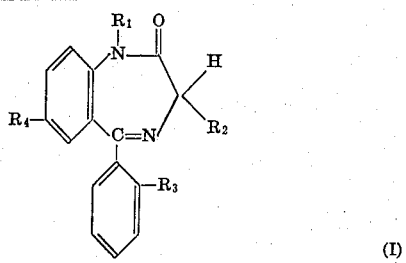

wherein $R_1$ represents a hydrogen atom, lower $C_1 - C_4$ alkyl group such as methyl, ethyl, n-propyl, n-butyl group or cyclo $C_3 - C_6$ alkyl $C_1 - C_4$ alkyl group such as cyclopropylmethyl, cyclo hexylmethyl group, $R_2$ represents a hydrogen atom or hydroxyl group, $R_3$ represents a hydrogen atom or halogen atom such as chlorine or fluorine and $R_4$ represents a hdyrogen atom, halogen atom such as chlorine, bromine or a nitro group, are useful as neurotropic medicinal agents and the metabolism thereof is being studied widely in recent years.

In the analysis of such benzodiazepine compound it has been conventional to use a thin layer chromatography, but only a slight amount of a sample can be handled with such method.

Therefore, in case a separation or recovery of a benzodiazepine compound on an industrial large scale method is required, the thin layer chromatography is not practical. For example, according to U.S. Pat. No. 3,453,179, there is employed a thin layer chromatography for isolating benzodiazepine compounds, but, even by said method, the amount of the material which is subjected to the treatment is about 100 to 200 mg. at most. Therefore when a large amount is to be handled it is necessary to use another means, for example, a column chromatography. However, there has been no literature to date on the separation of this compound by column chromatography.

Therefore, it is an object of the present invention to provide a method for the isolation and/or purification of benzodiazepine compounds efficiently on an industrial large scale.

Other objects of the present invention will become apparent from the following description.

We have now found that a benzodiazepine compound in a complicated compositiion can be separated even on an industrial scale when a hydroxypropylated dextran gel is used as a carrier for a chromatography for the separation of the benzodiazepine compound. This finding is surprising and unexpected because those materials which have usually been used as carriers for a column chromatography, such as, silica gel, alumina, cellulose and ion exchange cellulose are not satisfactory for the separation of benzodiazepine compounds. We have found that only hydroxypropylated dextran gel is remarkably excellent in the activity for separating benzodiazepine compounds. Another advantage of said carrier, i.e., hydroxypropylated dextran gel, is that it can be regenerated to be used many times.

In carrying out the method of the present invention, a benzodiazepine compound present as mixed in a complicated composition such as an animal tissue homogenate or a microorganism culture is extracted with an organic solvent immiscible with water such as chloroform, methane dichloride or carbon tetrachloride and then the extract is concentrated. Then the concentrated extract is passed through a column filled with a hydroxypropylated dextran gel in the usual manner. It is preferable that the carrier is washed with chloroform before charging into the column, and the charging is conducted with chloroform as a solvent. The elution may be carried out with chloroform and then with a polar solvent such as ethanol or methanol.

The invention will be explained in more detail by referring to the following Examples which are given for the illustrative purpose only and not for limiting the scope of the invention

EXAMPLE 1

A mixture of 10, 5, 10 and 10 mg. respectively of four different benzodiazepine compounds A to D represented by the general formula

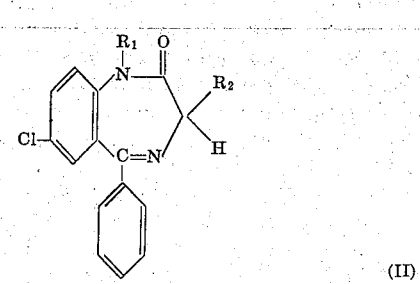

but different in $R_1$ and $R_2$ as shown in Table 1 was added to 70 ml. of a homogenate of a rat liver and the resultant mixture was well agitated and was then extracted with chloroform six times (30 ml. × 6). The chloroform layer was separated by centrifuging, dehydrated over anhydrous sodium sulfate and was then filtered. The solvent in the thus obtained filtrate was distilled away under reduced pressure.

TABLE 1

| | A | B | C | D |
|---|---|---|---|---|
| $R_1$ | $-CH_2-CH\begin{smallmatrix}CH_2\\CH_2\end{smallmatrix}$ | $-CH_2-CH\begin{smallmatrix}CH_2\\CH_2\end{smallmatrix}$ | $-H$ | $-H$ |
| $R_2$ | $-H$ | $-OH$ | $-H$ | $-OH$ |

On the other hand, a column of 2.5 cm. × 40 cm. was filled with Sephadex LH-20 (trade name of hydroxypropylated dextran gel produced by Pharmacia Co.) swollen with chloroform. Then the above prepared concentrate (10 ml.) was added on the top of the column and eluted with chloroform in the usual manner. The elution was taken in each 5 ml. fraction. For the analysis of each fraction a thin layer chromatography with silica gel HF was employed. The compound A was first eluted in the fraction No. 17 and then the compound B came to be eluted. When the elution was further continued with chloroform, the compound C came to be eluted in the fraction No. 35. Chloroform was made to flow until the compound C was completely eluted. Then the elution was conducted with ethanol. The compound D was eluted at last. The respective fractions of the compounds A, B, C and D were concentrated and were crystallized from ethanol to obtain the compounds A, B, C and D respectively at recovery rates of 70, 65, 90 and 85 percent.

EXAMPLE 2

A mixture of the compounds A to D (each 100 mg.) represented by the general formula

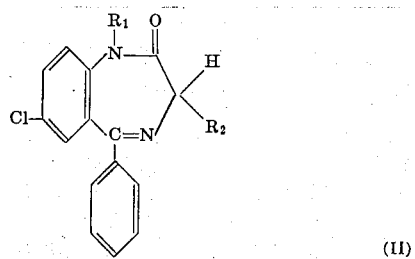

(II)

but different in $R_1$ and $R_2$ as shown in Table 2, was treated in the same manner as in Example 1 and were chromatographed with a column of 2.5 cm. × 100 cm. filled with Sephadex LH-20 swollen with chloroform. Thus when the elution was conducted in the same manner as in Example 1, the compound A was first eluted and then the compound B and further the compound C were eluted. Lastly, with ethanol, the compound D was eluted.

Table 2

|       | A     | B     | C   | D   |
|-------|-------|-------|-----|-----|
| $R_1$ | —CH₃  | —CH₃  | —H  | —H  |
| $R_2$ | —H    | —OH   | —H  | —OH |

The fraction of the compounds A to D were respectively collected, concentrated and then crystallized with ethanol to obtain 75, 63, 96 and 90 mg. respectively of the compounds A, B, C and D. The infrared absorption spectra of these respective compounds coincided with those of the respective standard specimens and presented a single spot in a thin layer chromatography.

EXAMPLE 3

A mixture of the compounds A and B (each 10 mg.) represented by the general formula

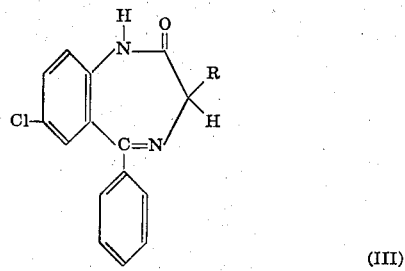

(III)

but different in R as shown in Table 3, was mixed with 100 ml. of a culture liquor prepared by the cultivation of Bacillus Subtilis in a bouillon for two days. Then the mixture was well agitated and extracted with chloroform in the same manner as in Example 1. The extract was dehydrated over anhydrous sodium sulfate, and then concentrated and was chromatographed with Sephadex LH-20 under the same conditions as in Example 1.

Table 3

|   | A  | B   |
|---|----|-----|
| R | —H | —OH |

The compound A was first eluted and then, only with ethanol, the compound B came to be eluted out. The recovery rates of the compounds A and B were respectively 96 and 90 percent.

EXAMPLE 4

Streptomyces Calvus S-4, which has been deposited in the Fermentation Research Institute Agency of Industrial Science and Technology, Ciba, Japan under the accession number FERM-P No. 944, was cultivated in a Bennet culture medium. The 0.1 percent of 5-phenyl-7-chlor-1,3-dihydro-2H-1,4-benzodiazepine-2-one was added to the culture medium and was enzymatically converted therein to obtain a culture liquor containing 3-hydroxy-5-phenyl-7-chlor-1,3-dihydro-2H-1,4-benzodiazepine-2-one.

The above prepared culture liquor was extracted with chloroform, then dehydrated over anhydrous sodium sulfate, concentrated and was separated and purified in the same manner as in Example 1. As a result, the starting compound (5-phenyl-7-chlor-1,3-dihydro-2H-1,4-benzodiazepine-2-one) and 3-hydroxy-5-phenyl-7-chlor-1,3-dihydro-2H-1,4-benzodiazepine-2-one resulting from the enzymatic conversion were obtained. The infrared absorption spectra of both coincided respectively with those of the standard specimens.

What we claim is:

1. A method of separating a benzodiazepine compound of the formula

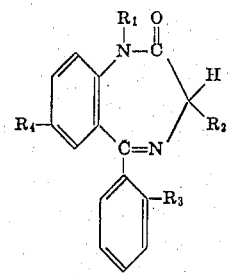

wherein $R_1$ represents hydrogen, $C_1 - C_4$ alkyl or $C_3 - C_6$ cycloalkyl $C_1 - C_4$ alkyl, $R_2$ represents hydrogen or hydroxy, $R_3$ represents hydrogen or halogen and $R_4$ represents hydrogen, halogen or nitro, from a material containing a mixture of the benzodiazepine compounds, which comprises extracting the mixture of the benzodiazepine compounds from the material containing said compounds with an organic solvent and subjecting the extract to chromatography with hydroxypropylated dextran gel to separate each of the benzodiazepine compounds contained in the mixture from each other.

* * * * *